US007013984B2

(12) United States Patent
Atkinson et al.

(10) Patent No.: US 7,013,984 B2
(45) Date of Patent: Mar. 21, 2006

(54) POWERED TOOL

(75) Inventors: Glyn Rodney Atkinson, Sheffield (GB); Brian Quartermain, Chesterfield (GB)

(73) Assignee: Standall Tools Limited, Sheffield (GB)

( * ) Notice: Subject to any disclaimer, the term of this patent is extended or adjusted under 35 U.S.C. 154(b) by 0 days.

(21) Appl. No.: 10/763,912

(22) Filed: Jan. 23, 2004

(65) Prior Publication Data

US 2005/0103508 A1 May 19, 2005

(30) Foreign Application Priority Data

Nov. 17, 2003 (GB) .................................. 03257229

(51) Int. Cl.
*B25D 17/02* (2006.01)
(52) U.S. Cl. ..................... 173/1; 173/2; 173/162.1; 173/171; 173/211; 173/DIG. 2
(58) Field of Classification Search ............ 173/162.1, 173/DIG. 2, 210, 211, 162.2, 171, 1, 2; 175/374, 175/425
See application file for complete search history.

(56) References Cited

U.S. PATENT DOCUMENTS

| 2,989,130 | A | * | 6/1961 | Mathewson, Jr. et al. ..... 175/56 |
| 3,815,691 | A | * | 6/1974 | Richter et al. ................. 175/56 |
| 3,823,786 | A | * | 7/1974 | Voitsekhovsky et al. .... 173/126 |
| 3,842,942 | A | * | 10/1974 | Jensen et al. ........... 173/DIG. 2 |
| 3,856,107 | A | * | 12/1974 | Rabett .................... 173/DIG. 2 |
| 4,030,553 | A | | 6/1977 | Rockwell |
| 4,296,830 | A | | 10/1981 | Rossander et al. |
| 5,915,508 | A | | 6/1999 | Lai |
| 6,439,359 | B1 | | 8/2002 | Kato et al. |

FOREIGN PATENT DOCUMENTS

| DE | 3122968 | 12/1982 |
| FR | 2151738 | 4/1973 |
| GB | 2 035 184 | 6/1980 |

OTHER PUBLICATIONS

European Search Report, Application No. EP 03 25 7229.9, dated May 4, 2004, 9 pages.

* cited by examiner

*Primary Examiner*—Scott A. Smith
(74) *Attorney, Agent, or Firm*—Harness, Dickey & Pierce, P.L.C.

(57) ABSTRACT

A tool for a powered machine, having vibration damping member. A method of providing a tool having a vibration damping member arrangement, applicable to different tools, is described. Estimated antinode positions along the tool in use are determined and a vibration damping member arrangement is located to cover at least one selected antinode position.

22 Claims, 12 Drawing Sheets

Beams of uniform section and uniformly distributed load

Natural frequencies $f_n = \dfrac{A}{2\pi} \sqrt{\dfrac{EI}{\rho S l^4}}$ where $\pi$ = pi (~3.142)
  $E$ = Young's modulus ($Nm^{-2}$)
  $I$ = Area moment of inertia of beam cross section ($Kg\, m^2$)
  $l$ = Length of beam (m)
  $\rho$ = Mass density of beam material ($Kgm^{-3}$)
  $S$ = Area of cross section ($m^2$)
  $A$ = Coefficient from Figure 5

— 1001

$\lambda = \dfrac{c}{f}$ where $c$ = wave speed ($ms^{-1}$)
  $f$ = Frequency (Hz)
  $\lambda$ = Wavelength (m)

POWERED TOOL

BACKGROUND OF THE INVENTION

1. Field of the Invention

The present invention relates to a tool for a powered machine, the tool having vibration damping means.

2. Description of the Related Art

A type of powered machine has a driver arranged to operatively drive a tool. An example of such a powered machine is a pavement breaker. Typically, a tool inserts into the driver and the driver drives the tool in a percussive and/or rotary manner; the tool functioning to transfer the energy imparted thereto from the driver to the medium against which the tool is worked.

Associated with powered machines are noise and vibration. Such effects are undesirable, especially for operators of powered machines, and present health risks. For example, high levels of noise can cause noise-induced hearing loss. Practical measures that can be taken to reduce the effects of noise on an operator are to provide the operator with ear defenders and to provide the operator with a driver fitted with silencing means.

Powered machine operators are particularly at risk from hand-arm-vibration syndrome; a condition that can affect circulation, sensory and motor nerves and can cause musculo-skeletal problems. Practical measures to reduce the effects of vibration on an operator from existing powered machines are to ensure that each powered machine is worked in accordance with manufacturer instructions.

Although means to protect an operator of a powered machine from potentially injurious noise and vibrations therefrom are useful, it is desirable in powered machine technology to reduce such vibration and noise emanating from the powered machine in the first place.

BRIEF SUMMARY OF THE INVENTION

According to a first aspect of the present invention there is provided a method for providing a tool for a powered machine, the tool having vibration damping means, said method comprising the steps of: a) determining an estimated antinode position of vibration of the tool in use when the tip of the shaped working end is hinged and the tip of the striking end is free to vibrate; and b) locating a vibration damping member to cover the antinode position determined in step a).

According to a second aspect of the present invention there is provided a tool for a powered machine, the tool having vibration damping means, said vibration damping means comprising a vibration damping member located to cover an estimated antinode position of vibration of the tool in use when the tip of the shaped working end is hinged and the tip of the striking end is free to vibrate.

BRIEF DESCRIPTION OF THE SEVERAL VIEWS OF THE DRAWINGS

FIG. 10 shows equations for calculating a comparison set of estimated antinode positions along a powered tool;

WRITTEN DESCRIPTION OF THE BEST MODE FOR CARRYING OUT THE INVENTION

Figure 1:
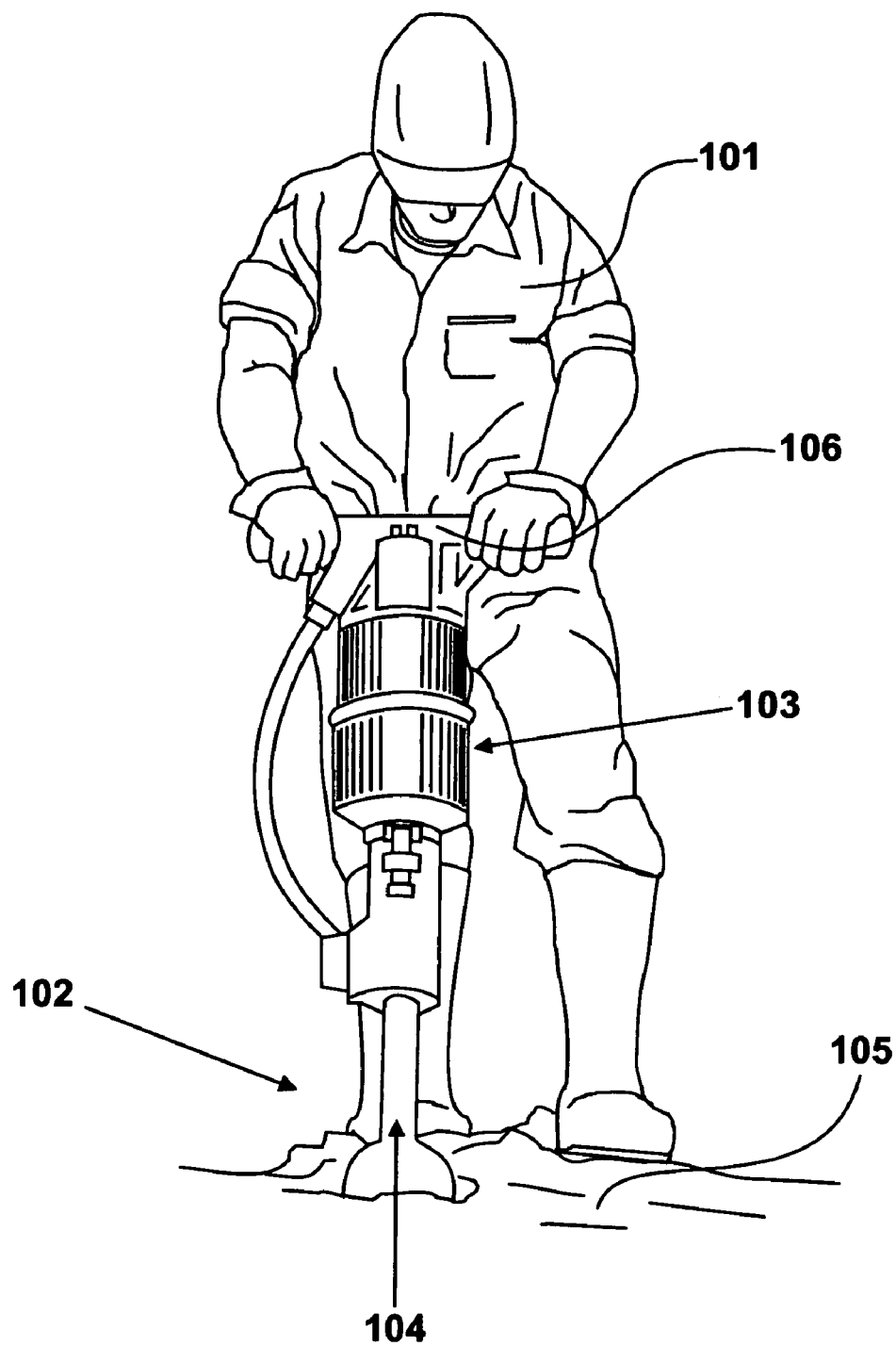
FIG. 1 shows an operator using a powered machine.

FIG. 1 shows an operator 101 manually operating a powered machine. Herein, the term "powered machine" is used to refer to a machine comprising a driver and a tool configured to be driven by the driver, in combination. Th term "powered machine" includes hand held, portable or supported machines operating under pneumatic, hydraulic, mechanical, electric mains or battery power, that operatively produce a reciprocating motion to transfer energy to a tool, in combination with a tool. Herein, the term "tool" is used to refer to a tool for a powered machine and the term "powered tool" is used to refer generally to a tool in use.

Powered machine 102 comprises a driver 103 and a tool 104. In this example, driver 103 is a pneumatic driver and tool 104 is a digger spade. In using the powered machine 102 to dig ground 105, the operator 101 grips both hands around the handlebar 106 of the driver 103 whilst directing the tool 104 into the ground 105. During use, undesirable noise is emitted from the powered machine 102, and undesirable vibrations are transferred from the powered machine 102 to the operator 101 via the handlebar 106. The level and nature of the undesirable vibration and noise experienced by the operator varies according to many factors, including the condition of the powered machine, the body mass of the operator and the changing physical relationship between the powered machine and the worked medium during the working of the medium.

Figure 2:
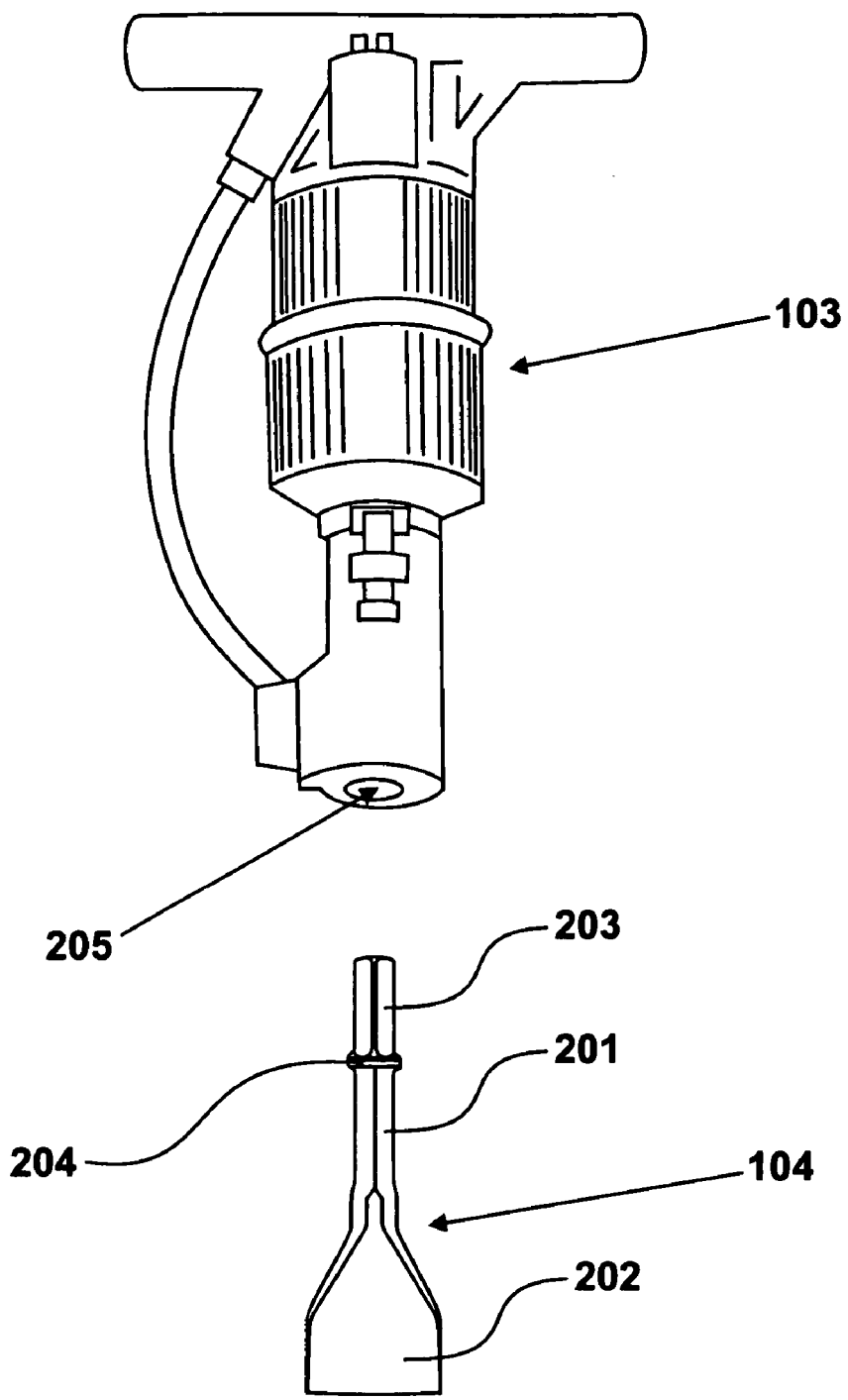
FIG. 2 shows components of the powered machine of FIG. 1 in a separated arrangement.

The driver 103 and tool 104 components of powered machine 102 are shown in a separated arrangement in FIG. 2. It can be seen from this Figure that tool 104 comprises a body 201 having a shaped working end 202 and a striking end 203. The tool 104 has a tool retaining arrangement 204, in this example in the form of a tool retaining collar extending around the body 201.

At the opposite end of the driver 103 to the handlebar 106 is a tool insertion aperture 205. To connect the tool 104 with the driver 103, the striking end 203 of the tool 104 is inserted into the tool insertion aperture 205 of the driver 103. The driver 103 comprises tool retaining means (not shown) configured to co-operate with the tool retaining arrangement 204 to maintain the tool 104 in position within the driver 103.

Figure 3:
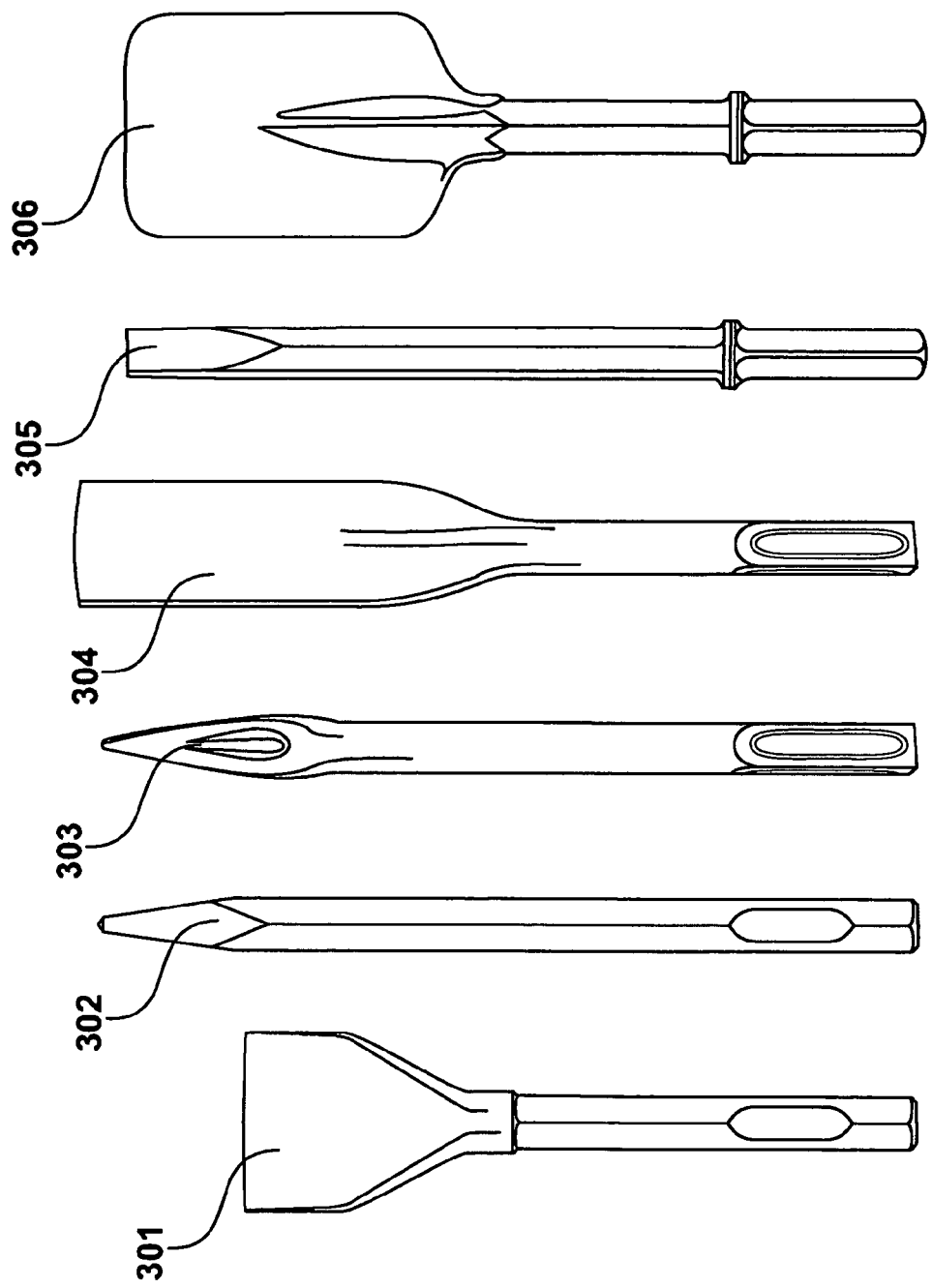
FIG. 3 shows different tools suitable for use in combination with different drivers.

Drivers are typically designed to allow tools for different purposes to be interchangeably used therewith. Shown in FIG. 3 is an example range of different tools, suitable for use in combination with different drivers. The shown tools are a tarmac® cutter tool 301, a moil point tool 302, a heavy-duty burster tool 303, a digging chisel tool 304, a narrow chisel tool 305 and a clay spade tool 306. Tools 301 and 302 each have the same shape cross-section of body and tool retaining arrangement, tools 303 and 304 each have the same second different shape cross-section of body and tool retaining arrangement, and tools 305 and 306 each have the same third different shape cross-section of body and tool retaining arrangement.

Figure 4:
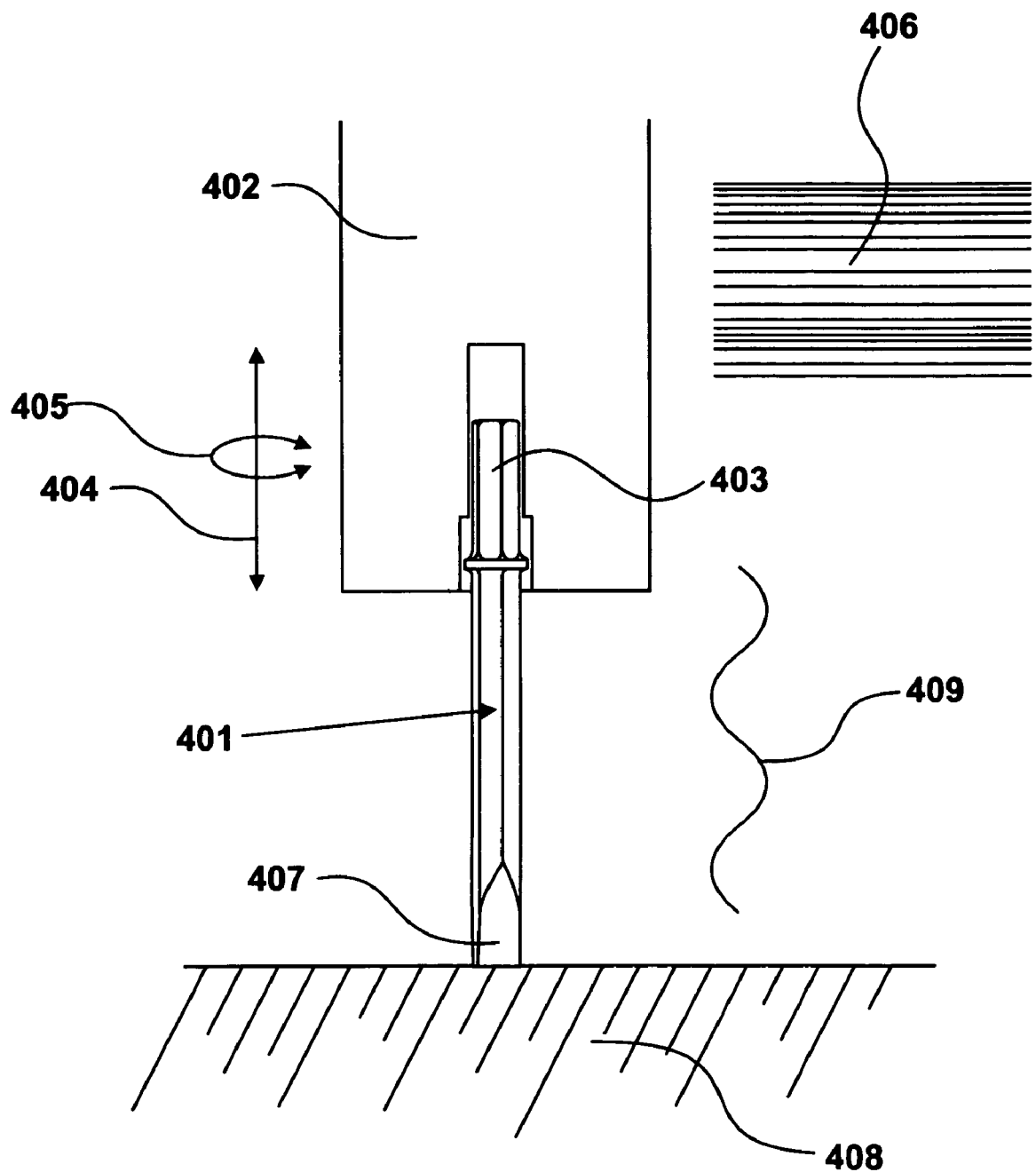
FIG. 4 shows the action of a tool and driver of a powered machine.

FIG. 4 is a diagram illustrating action of a powered tool 401 and a driver 402. During operation, the striking end 403 of the powered tool 401 is driven percussively, causing the powered tool 401 to move up and down and/or to rotate, in the directions indicated generally by double-headed arrows 404 and 405 respectively.

During use, energy is imparted to the tool 401 from the driver 402. Energy imparted from action of the driver 402 translated in the axial direction along the tool 401, indicated by arrow 404, is represented at 406 as a longitudinal wave. This energy is transmitted along the tool 401 towards the shaped working end 407 thereof. In operation, with the shaped working end 407 of the tool 401 impacting against a worked medium 408, the dominant modes of vibration of the tool 401 are flexural; represented at 409 as a transverse wave.

Although the transport of energy from the driver to the tool of a powered machine is a core function within the powered machine, it is desirable to reduce noise and vibration transmitted from the powered machine to the operator thereof, in order to reduce the risk of noise and vibration induced injury. Thus, it is desirable to reduce the noise and vibration effects from energy reflected back from the shaped working end 407 of the powered tool 401.

The present invention relates to a technique for reducing undesirable noise and vibration transmitted from a powered machine. A method for providing a tool having vibration damping is provided. Herein, the term "vibration damping" is used to refer to vibration and noise damping. The present invention utilises an approach focussing on undesirable noise and vibration emanating from the tool component, rather than the driver component, of a powered machine.

In a powered machine, the tool is a medium for the transfer of energy from the driver. Energy is transported in mechanical wave form; the tool itself does not create or dissipate energy. However, energy can be dissipated from a wave through the boundary between the tool and the immediate environment. For example, noise emanating from a powered tool is caused by decaying oscillations within the tool. Thus, an increase in oscillation decay translates to a reduction in noise.

It is known that large amplitude waves occur at resonant frequencies and that the amount of energy transported by a harmonic wave is proportional to the amplitude of the wave. Dissipation of energy transported by the wave reduces the amplitude of the wave and changes the shape thereof. It is preferable for a node to occur near each end of the powered tool.

Viscoelastic materials, such as some rubbers and plastics, possess a molecular structure able to store strain energy when deformed and then dissipate the stored energy quickly. Therefore, viscoelastic materials are often used in vibration damping. Since such materials dissipate energy only when distortion occurs, the optimum area in which to position vibration damping means is at an antinode of a wave.

However, it is a complex problem to determine where antinodes occur along a powered tool. The present invention provides a model for determining anticipated antinode positions along a tool, when the tool is in use, practically applicable to different shaped tools. From herein, the terms "antinode position" and "node position" are used to refer to an estimated position of an antinode and a node respectively of the vibration of a tool when in use.

Figure 5:
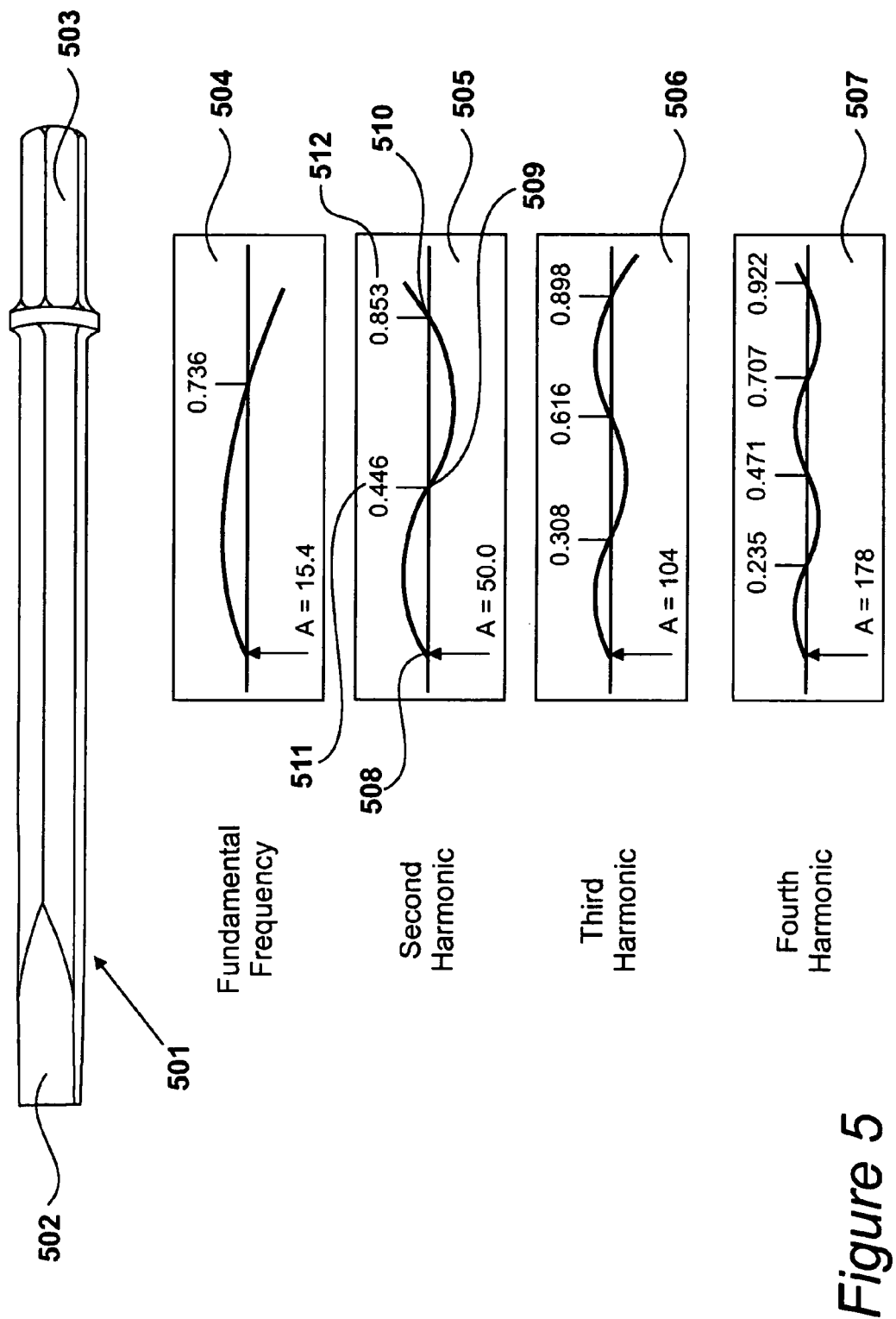
FIG. 5 shows modelled conditions for a powered tool.

FIG. 5 shows a tool 501, having a shaped working end 502 and a striking end 503. In this example, the working end 502 of the tool 501 is a narrow chisel.

The present invention utilises tool modelling. A tool is modelled to have hinged-free boundary conditions; with the tip of the shaped working end modelled as a hinge and the tip of the striking end modelled as a free boundary, free to vibrate. Referring to FIG. 4, these conditions are derived from the factor of freedom of the striking end of a powered tool when not being impacted by the driver, and an approximation of the shaped working end of the powered tool falling between free and fixed boundary conditions. These boundary conditions are representative of real life working conditions, which vary, for example, with the way a tool is retained in a driver, the depth of a powered tool in a worked medium and the characteristics of the worked medium itself.

The mode shapes of the first four harmonics for a beam, or rod, having a uniform section and uniformly distributed load under hinged-free boundary conditions are shown at 504, 505, 506 and 507 respectively. It can be seen that for each mode shape, there is a node at the hinged end. Shown along each mode shape 504, 505, 506, 507 are coefficients from which each node position occurring along the mode shape can be determined, if the length of the beam is known. Relating this to the tool 501, the length measurement is taken to be the full length of the tool, i.e. the distance between the tip of the shaped working end 502 and the tip of the striking end 503.

To determine antinode positions from each mode shape, first the estimated node positions are determined, by multiplying the relevant coefficient by the length measurement of the tool. Then the midpoint of the distance between two consecutive node positions along the mode shape is determined and each is taken to be an antinode position for that mode shape.

For example, for a tool having a length of 0.8 m, there is a first node 508 at the tip of shaped working end and two further node positions, second node position 509 and third node position 510. The second and third node positions 509, 510 are determined by multiplying the first node coefficient 511 and the second node coefficient 512 respectively by the length measurement. For this example, second node position 509 occurs at 0.3568 m (0.446×.0.8 m) from the first node and third node position 510 occurs at 0.6824 m (0.853×0.8 m) from the first node 508. To find the two antinode positions, the midpoints between consecutive node positions of the same mode shape are determined. For this example, the first and second estimated antinode positions occur at 0.1784 m and. 0.5196 m from the first node 508 respectively.

This antinode position determination process can be simplified with the display of antinode coefficients on the mode shapes shown at 504, 505, 506 and 507, allowing more direct derivation of antinode positions.

Figure 6:
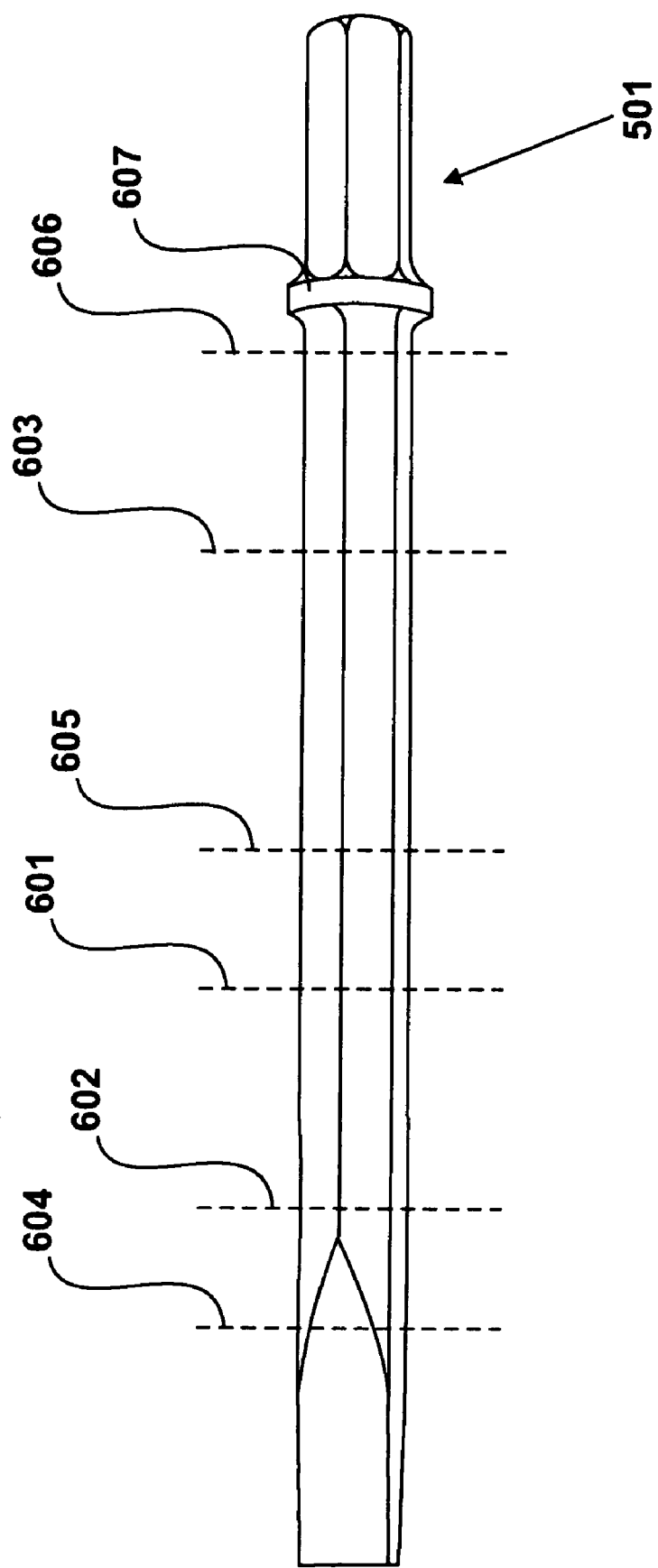
FIG. 6 shows estimated antinode positions along a powered tool.

FIG. 6 shows the antinode positions along tool 501 derived from the first three harmonic mode shapes, shown at 504, 505 and 506 in FIG. 5; determined as described with reference to FIG. 5. Of the six antinode positions indicated along tool 501, position 601 is derived from the first harmonic (fundamental frequency) mode shape, positions 602 and 603 are derived from the second harmonic mode shape and positions 604, 605 and 606 are derived from the third harmonic mode shape.

It is found that the energy transported in relation to each harmonic vibration mode successively decreases with each higher harmonic mode. In practice, although it may be useful to find antinode positions along mode shapes for the fourth and higher harmonics, vibration damping of at least one of the first three harmonics offers a greater benefit.

The determined antinode positions indicate potential optimal positions at which to apply vibration damping means to the tool. In selecting one or more antinode positions, assessment of the practicalities of positioning a vibration damping member at each antinode position is performed. For example, antinode positions 602 and 604 are close to the shaped working end part 502 and antinode position 606 is close to the tool retaining arrangement 607, leaving antinode positions 601, 603 and 605 as preferred candidates.

Figure 7:
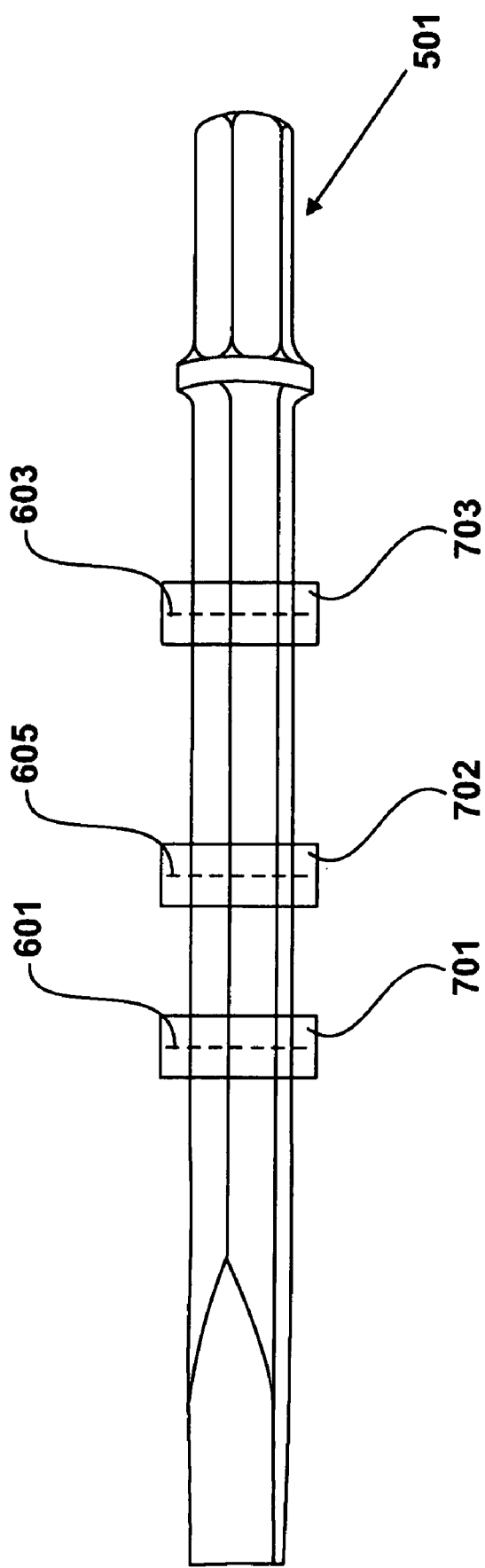
FIG. 7 shows a first arrangement of vibration damping means for the tool of FIG. 6.

FIG. 7 illustrates a first vibration damping means for tool 501. First, second and third vibration damping members 701, 702, 703 respectively are each located to cover an antinode; each vibration damping member is individual to an estimated antinode position. As shown, the vibration damping members 701, 702, 703 are arranged around the body of the tool 501 with an antinode position 601, 605, 603 respectively central thereto.

Figure 8:
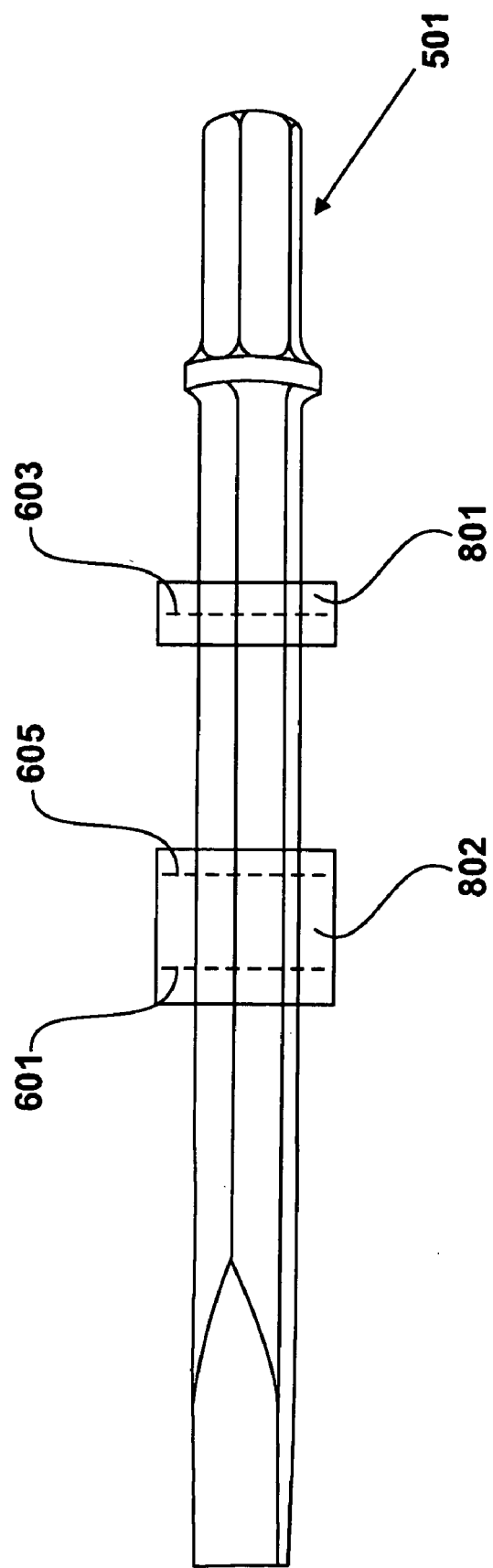
FIG. 8 shows a second arrangement of vibration damping means for the tool of FIG. 6.

A second arrangement of vibration damping means is shown in FIG. 8. According to this arrangement, two vibration damping members 801, 802 are arranged to cover the three antinode positions 601, 603, 605. In this example, damping member 801 is individual to antinode position 603. Due to the proximity of antinodes 601 and 605, damping member 802 is conveniently located to cover both antinode positions 601, 605. According to this arrangement, damping member 802 is longer than damping member 801 and extends beyond the antinode positions 601, 605.

Figure 9:
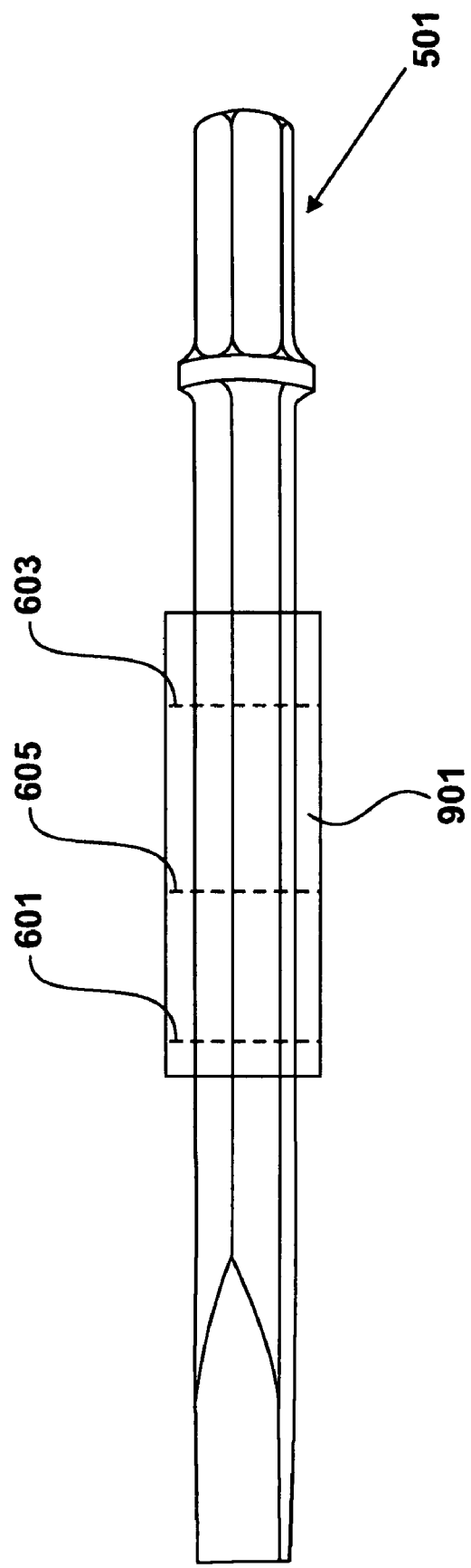
FIG. 9 shows a third arrangement of vibration damping means for the tool of FIG. 6.

A third arrangement of vibration damping means is shown in FIG. 9. According to this arrangement, a single vibration damping member 901 is located to cover the three antinode positions 601, 603, 605. In the shown example, the damping member 901 is long enough to extend beyond the outer antinode positions 601, 603.

As previously described, a model is provided for determining estimated antinode positions along a powered tool. Equation 1001, shown in FIG. 10, is a formula for the calculation of the natural frequencies of a beam, or rod, of uniform section and uniformly distributed load. Equation 1002, also shown in FIG. 10, is a formula for calculating the wavelength of a wave. In using equation 1001 to calculate the natural frequencies of a tool, simplifications of the shape of the tool are required. However, these formulae 1001, 1002 can provide a second comparison results set of antinode positions along a tool; this results set is useful for the purpose of comparison with the results from determining antinode positions as described with respect to FIG. 5.

Equation 1001 is as follows. Multiply the Young's modulus (E) by the area moment of inertia of beam cross section (I). Divide the result of this multiplication by the mass density of beam material ρ by the area of cross section of the beam (S), and by the length of the beam L raised to the power of four (4). Take the square root of the result; the result of this is referred to as the first calculation result. Then divide the A coefficient from the relevant harmonic mode shape shown in FIG. 5 or other diagram by two (2) and by pi (.about. 3.142). The result of this is referred to as the second calculation result. Then multiply the first calculation result by the second calculation result to find the natural frequency (fn) for the relevant harmonic.

The frequency result determined using equation 1001 is useable in equation 1002 to find wavelength. Equation 1002 is as follows. Wavelength (λ) equals wave speed (c) divided by frequency (f). To find the antinodes of the wave, divide the wavelength result found from equation 1002 by four (4). This result gives a first antinode position from one node of the wave. Then, multiply the first antinode position result by three (3) to find a second antinode position from the same node.

Figure 11:
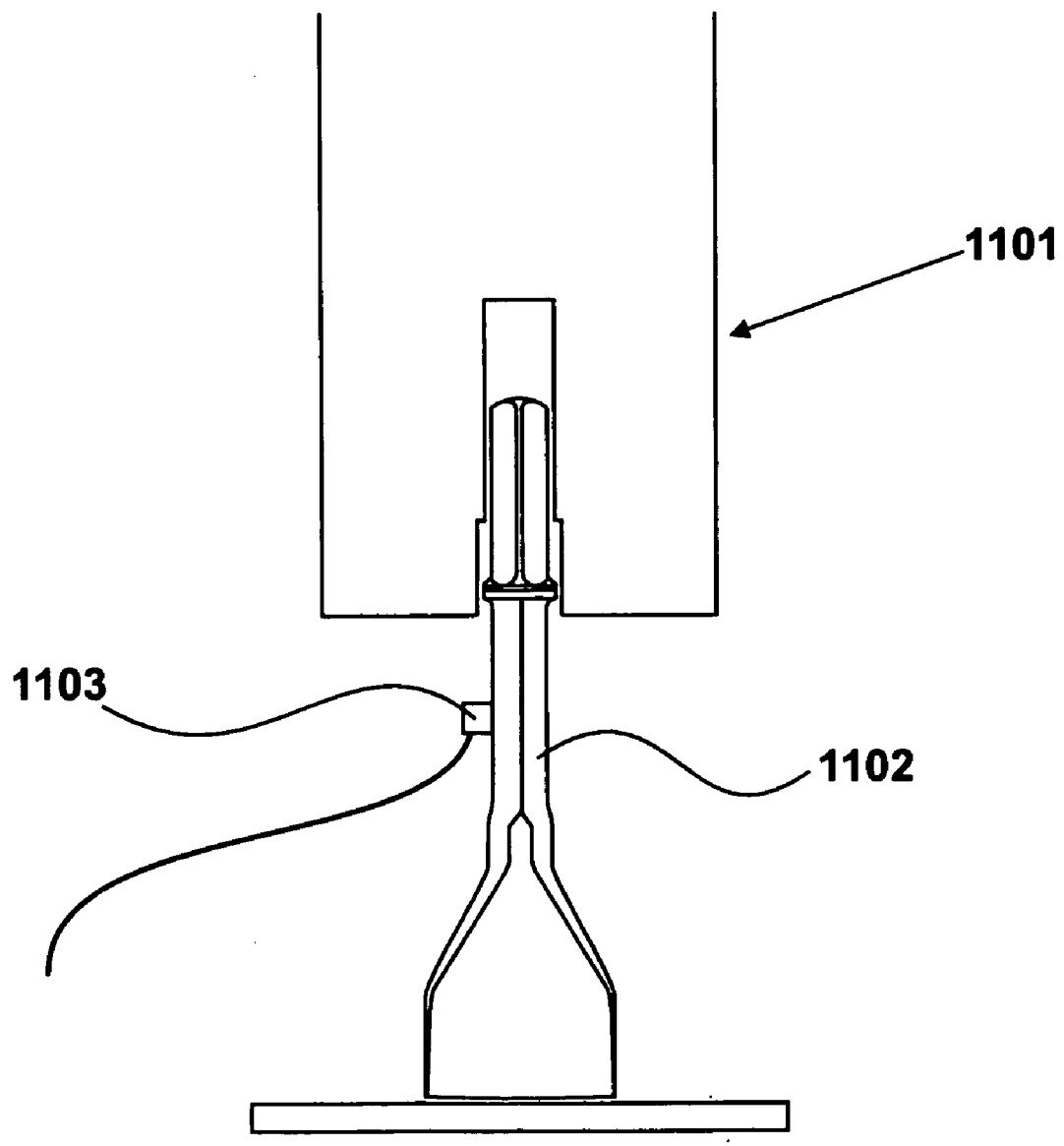
FIG. 11 is a schematic of laboratory testing equipment for testing vibration of a tool in use.

In order to determine the effects of vibration damping on the vibration and noise emissions from a powered tool, it is useful to perform comparative vibration testing of a powered tool having vibration damping means and a similar powered tool not having any vibration damping. A schematic of apparatus 1101 for testing in a laboratory the effects of vibration damping means applied to a powered tool as described above is shown in FIG. 11. The apparatus 1101 is arranged to allow simulation of modelled boundary conditions for the tool being tested. Each tool, for example tool 1102, is tested according to a vibration magnitude method, in which the striking end of the tool is impacted and readings are taken from an accelerometer 1103 mounted on the body thereof, with readings being taken from different positions along the tool.

Figure 12:
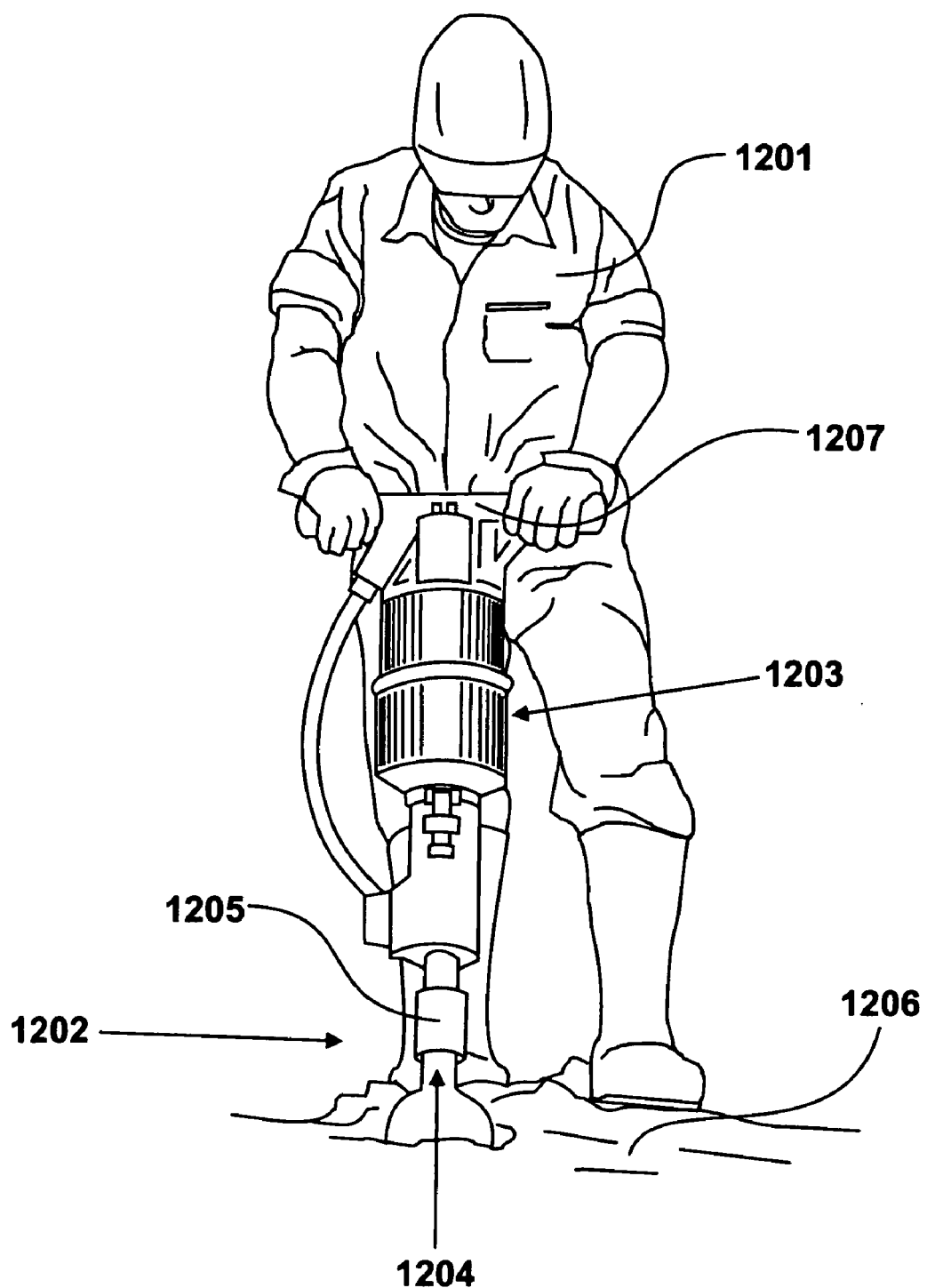
FIG. 12 shows an operator using a powered tool having vibration damping means.

FIG. 12 shows an operator 1201 manually operating a powered machine 1202, comprising a driver 1203 and a tool 1204 having vibration damping means located to cover an estimated antinode position determined as described with reference to FIG. 5. In this example, the vibration damping means comprises a single vibration damping member 1205. In the shown example, driver 1203 is a pneumatic driver and tool 1204 is a digger spade, suitable for working ground 1206. The operator 1201 is gripping the handlebar 1207 of the driver 1203 with both hands whilst directing the tool 1204 into the ground 1206. The vibration damping member 1205 functions to reduce vibrations transferred from the powered machine 1202 to the operator 1201. This function makes the powered machine more comfortable for the operator to use, and reduces potentially injurious vibrations and noise.

Preferably, the vibration damping means is fabricated from a different material to that of the tool. In this example, the tool 1204 is a forged and machined steel tool of length 0.62 m, and the vibration damping member 1205 is a polypropylene moulded tube of length 0.03 m and thickness 0.002 m. For a tool of approximately this length, practical vibration damping member dimensions are in the approximate range of between 0.02 m and 0.04 m in length and between 0.001 m and 0.003 m in thickness.

A vibration damping member may be fitted to a tool by one of various methods, for example by an adhering method or method in which a vibration damping member is mechanically forced onto the tool. Particularly applicable for vibration damping members in the form of a collar is a shrinking method during which the diameter of the vibration damping member is shrunk from a diameter initially greater than that of the body of the tool until contact between the vibration damping member and the tool is made. For effective damping, there should be good contact between a vibration damping member and the tool on which it is located. If the selected material is not self-adhering to a tool, adhesive, such as epoxy, may be used between the vibration damping member and the tool. Preferably, a vibration damping member is fabricated from a material composition having a high resistance to abrasion, to reduce the wear thereof. A vibration damping member may have internal and/or external protrusions to account for different shapes of tool body.

The described method of providing a tool for a powered machine having vibration damping is applicable to tools of various designs and sizes; for example, tools made by different processes, including forging and/or machining, tools having different shaped working ends, tools having different cross-section body shapes and/or different material composition. It is to be understood, however, that the described method of providing a tool with vibration damping means involves tool modelling, and the correlation between the results found by this method compared to the real life case is variable according to the specification of individual tools and the usage thereof.

The invention claimed is:

1. A method for providing a tool for a powered machine, the tool comprising a body having a shaped working end and a striking end, the tool having vibration damping means, the shaped working end having a tip, and the striking end having a tip, said method comprising the steps of:
    a) determining an estimated antinode position of vibration of the tool in use when the tip of the shaped working end is hinged and the tip of the striking end is free to vibrate; and
    b) locating a vibration damping member around the body of the tool to cover the antinode position determined in step a).

2. A method as claimed in claim 1, in which at step a) the tool is modelled as a uniform beam, or rod, having a uniform section and uniformly distributed load.

3. A method as claimed in claim 1, in which at step a) an estimated antinode position is derived from a mode shape of vibration of the tool in use, the mode shape of vibration including at least one of a first harmonic (fundamental frequency) mode shape, a second harmonic mode shape, and a third harmonic mode shape.

4. A method as claimed in claim 1, further comprising the steps of:
    c) determining a plurality of estimated antinode positions according to step a);
    d) selecting a plurality of antinode positions from the antinode positions determined at step c) to cover with a vibration damping member; and
    e) locating a vibration damping member arrangement to cover each selected antinode position.

5. A method as claimed in claim 4, in which said vibration damping member arrangement comprises a vibration damping member located to cover more than one estimated antinode position.

6. A method as claimed in claim 1, in which at step b) said vibration damping member is adhered, mechanically forced or shrunk onto said tool.

7. A method as claimed in claim 1, in which said vibration damping member is a viscoelastic vibration damping member.

8. A method as claimed in claim 1, in which said tool is manufactured by a process including forging.

9. A method as claimed in claim 1, in which said vibration damping member has a tube shape.

10. A method as claimed in claim 1, in which said tool is manufactured by a process including machining.

11. A method as claimed in claim 1, in which said tool is forged and machined steel.

12. A tool for a powered machine, the tool comprising a body having a shaped working end and a striking end, the tool having vibration damping means, the shaped working end having a tip, and the striking end having a tip, said vibration damping means comprising a vibration damping member located around the body of the tool to cover an estimated antinode position of vibration of the tool in use when the tip of the shaped working end is hinged and the tip of the striking end is free to vibrate, the tool manufactured by a method comprising the steps of:
    a) determining an estimated antinode position of vibration of the tool in use when the tip of the shaped working end is hinged and the tip of the striking end is free to vibrate; and
    b) locating a vibration damping member around the body of the tool to cover the antinode position determined in step a).

13. A tool as claimed in claim 12, comprising a vibration damping member that is adhered, mechanically forced or shrunk onto said tool.

14. A tool as claimed in claim 12, comprising a vibration damping member located to cover an estimated antinode position of vibration of the tool in use when the tool is modelled as a uniform beam, or rod, having a uniform section and uniformly distributed load.

15. A tool as claimed in claim 12, comprising a vibration damping member located to cover an estimated antinode position of a mode shape of vibration of the tool in use, the mode shape of vibration including at least one of a first harmonic (fundamental frequency) mode shape, a second harmonic mode shape, and a third harmonic mode shape.

16. A tool as claimed in claim 12, comprising a vibration damping member arrangement located to cover each of a plurality of estimated antinode positions.

17. A tool as claimed in claim 16, in which said vibration damping member arrangement comprises a vibration damping member located to cover more than one estimated antinode position.

18. A tool as claimed in claim 12, in which said vibration damping means is a viscoelastic vibration damping member.

19. A tool as claimed in claim 12, in which said tool is manufactured by a process including forging.

20. A tool as claimed in claim 12, in which said vibration damping member has a tube shape.

21. A tool as claimed in claim 12, in which said tool is manufactured by a process including machining.

22. A tool as claimed in claim 12, in which said tool is forged and machined steel.

* * * * *